May 5, 1964 I. CORON ETAL Re. 25,569

MULTISTAGE FAN

Original Filed Feb. 1, 1961

INVENTORS
IRA CORON
RICHARD C. MESS
BY
Milton E. Gilbert
ATTORNEY

United States Patent Office

Re. 25,569
Reissued May 5, 1964

25,569
MULTISTAGE FAN

Ira Coron, Trotwood, and Richard C. Mess, Bellbrook, Ohio, assignors to Globe Industries, Inc., Dayton, Ohio, a corporation of Ohio Original No. 3,066,850, dated Dec. 4, 1962, Ser. No. 86,439, Feb. 1, 1961. Application for reissue Apr. 10, 1963, Ser. No. 272,512
5 Claims. (Cl. 230—117)

Matter enclosed in heavy brackets [ ] appears in the original patent but forms no part of this reissue specification; matter printed in italics indicates the additions made by reissue.

This invention concerns a multistage fan, and is more particularly directed towards a miniaturized multistage fan or blower.

The present trend in the electronic industry towards high density packaging, and especially in airborne vehicles or packages where space is a limiting factor in design, the problem of heat transfer or cooling of electronic equipment is acute. These needs have stimulated the development of such cooling approaches as cryogenic cooling, thermoelectric cooling, transistor cold plates, and generally more efficient use of heat exchanger principles in order to dissipate heat from tightly packed enclosures. As the electronic package decreases in size, the flow pattern for convection cooling becomes highly restricted. This results in a large pressure drop through the system. This factor was the motivation for the development of the well known small vane axial fan. However, miniaturization has progressed, and will continue to progress to the point where the cooling requirement can be met most successfully with high pressure fans of the multi-stage axial blower type.

The staging of fan blades has been known, but where it is desired to employ a miniature fan having a relatively high output, such fans have been designed for high speed to attain the desired output. Obviously the life of such devices has been reduced. Also, when running such devices at relatively high speeds, any dynamic imbalance in the unit would shortly destroy it.

It is therefore one object of the invention to provide a multistage fan or blower of miniature form, which is simple to manufacture and meets the requirement of relatively high output at relatively low speed.

Another object of the invention is to provide a miniature multi-stage fan or blower which is simple to assemble and balance.

A still further object of the invention is to provide a miniaturized multistage blower which can readily be assembled and disassembled without destroying the dynamic balance of the unit.

A further object of the invention is to provide a readily balanced miniature multi-stage fan or blower in which it is simpler to hold concentricities.

Figure 2:
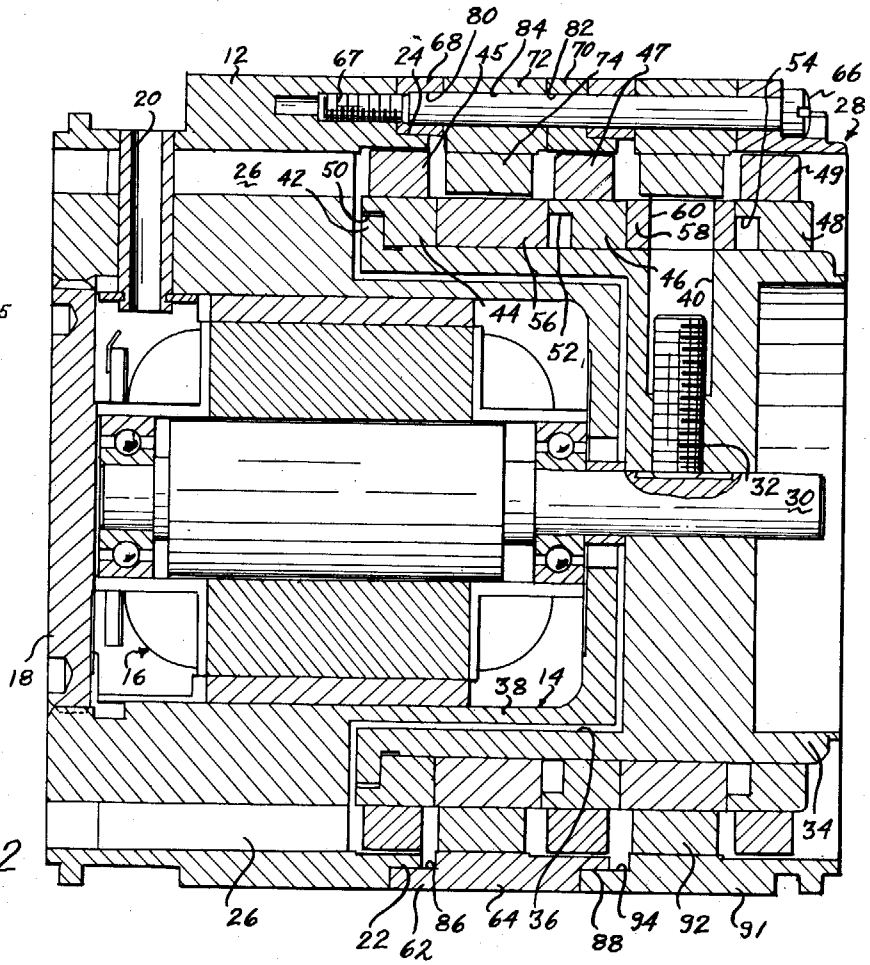
Figure 1:
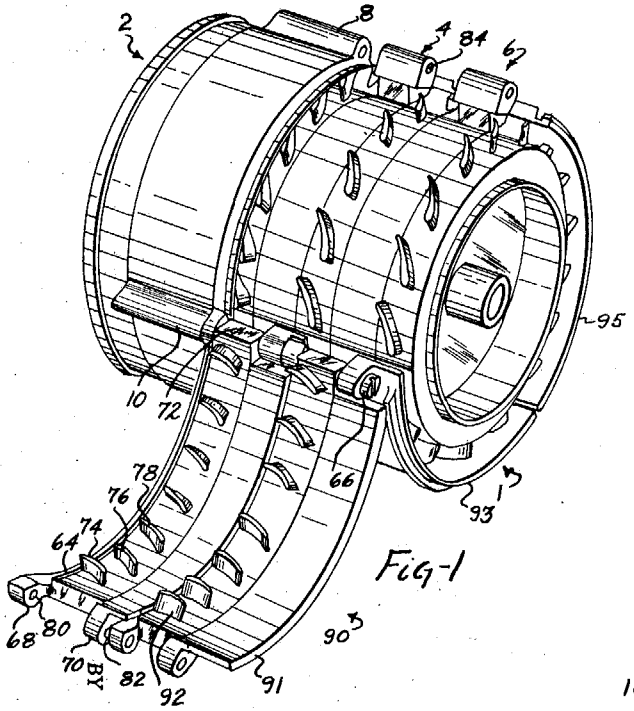

These and further objects of the invention will become more readily apparent upon a reading of the description following hereinafter, and upon an examination of the drawings, in which:

FIGURE 1 is a perspective view of a three stage miniature blower constructed in accordance with the teachings of the invention, and FIGURE 2 is a longitudinal view, in cross-section, of the blower of FIGURE 1.

According to the invention, each stage of the blower consists of a rotating propeller and a stationary guide vane section. The guide vanes are so arranged as to direct air flow in an axial direction when the blower is operating at close to peak output. Succeeding propellers are so arranged as to operate under identical conditions with the flow being axial at each propeller inlet. The outer housing consists of individual sections which are piloted on each other, and fastened together. The main housing encloses the driving motor, which may be A.C. or D.C., and also holds the third stage guide vanes. The first and second stage stators, or guide vane sections, are segmented or built up of "clam-shell" segments which are keyed together as a subassembly and finish machined. One segment of each stator can then be unlocked at final assembly. Although the invention is illustrated employing an A.C. induction motor and having three stages, it is to be readily understood that other motors and number of stages can be employed while still applying the teachings of the invention.

Referring now to the drawings, and as shown in FIGURE 1, the fan 1, comprises a main housing 2, and the two successive stages 4 and 6. In FIGURE 1, one segment of each of the two successive stages is shown in unlocked position ready for final assembly.

The main housing 2 is of generally cylindrical configuration, and is provided on its periphery with three ears or lugs 8, 10 and 12. The inner portion of the housing is provided with an enlarged bore 14, to receive the rotor of an A.C. induction motor 16. The bore 14 is closed by the end plate 18. An appropriate radial bore 20 is provided to accommodate the motor leads. The housing is further provided with the step or ridge 22 to permit the nesting, upon assembly, of the segmented stator of the next succeeding stage. The ears or lugs 8, 10 and 12 are similarly stepped as at 24, to permit the nesting of the ear of the next succeeding stator stage. The main housing 2 is further provided with the first stage of stator vanes for guiding the fluid flow.

The impeller 28 is mounted to the output shaft 30 of the motor 16 as by the set screw 32. This impeller consists of a central hub 34 having a bore 36 adapted upon assembly to fit around or pilot upon the housing extension 38. A side hole is provided at 40 to receive the set screw 32. The inner end of the hub is provided with an upturned flange 42. The first stage impeller ring 44 is shrunk fit on the external surface of the hub 34 against the flange 42, and is provided with the series of vanes 45 projecting therefrom. The ring 44 is further provided with the step portion 50 which pilots on the flange 42. Each of the impeller stages is made identically. Thus the impeller stage 46 has the vanes 47 and the stepped portion 52; and the impeller stage 48 has the vanes 49 and the stepped portion 54. The several impeller stages are positioned properly by the spacer rings 56 and 58, which are also shrunk fit on the hub 34. The ring 58 is provided with the hole 60 which is aligned with the hole 40 to enable assembly of the impeller 28 on the rotor shaft 30. This nested impeller assembly can readily be finished with true concentricities being held, by machining the outer and inner diameters concurrently. This will also enable ready balancing of the impeller by such machining, or by the well-known expedient of removing metal from the unbalanced portions thereof. Once this assembly is balanced, it can be readily assembled and disassembled to the same motor output shaft without disturbing its dynamic stability.

The second stage stator 62 consists of three segments 64 (only one of which will be described) which are of identical configuration. The segment 64 is provided at one end with the ears 68 and 70. The ear 68 has the through hole 80 and the ear 70 has the through hole 82. The opposite end of the segment 64 has the extension 72 provided with the through hole 84. As shown in FIGURE 2, upon assembly, the aligned holes 80, 82 and 84 will receive the shoulder screw 66.

The stator 62 is provided on its inner surface with the inwardly extending vanes 74, 76, 78, etc. The inner edge of the stator 62 is formed with the stepped flange 86 which pilots upon the step 22 of the main housing; while the outer edge of the stator 62 is formed with the step 88.

The third stage stator 90 is similarly formed as the second stage stator 62, and has the plurality of segments 91, 93 and 95 (see FIGURE 1). These segments are identical to the segments 64 of the second stage stator 62. Thus a series of vanes 92 are provided on the inner surface of the segment 91. The segment 91 has the inner stepped flange 94 which pilots upon the step 88 of the second stage stator to attain alignment of stator stages. The shoulder screw 66 passes through all of the holes in the ears of the aligned stator segments as shown in FIGURE 2 and is threaded into the main housing 2 as at 67.

Miniature multistage blowers constructed according to the teachings of the invention have been found to have a low specific speed, thus indicating usage similar to large radial wheel centrifugal blowers in high pressure applications. Where the overall dimensions of the unit are fixed by the environment of its installation, the multistage blower of the invention allows an increase in the fin density (i.e., number of vanes or fins per square inch) by a factor of 2 to 3, thus causing an increase in the difference in the temperature between the inlet and outlet air to the heat exchanger. The heat transfer rate would also increase since both the heat transfer coefficient and $\Delta T$ are increased in the well known heat transfer equation $q_c = h_c A \Delta T$. The net result is either an increase in the total watts dissipated capability of the blower, or a lower ambient temperature in operation, both results being highly desirable.

Although a specific preferred embodiment of the invention has been shown and described, it is to be understood, that various modifications may be made in the construction of a device according to the teachings of this invention without departing from the spirit or scope thereof.

What we claim is:

*1.* A unitary miniature multistage motor-blower comprising, in combination a main motor stator housing having an axially extending boss; a motor-armature rotatably mounted within said motor-stator housing and having an armature shaft extending therefrom through said boss, an impeller assembly mounted upon said shaft extension adjacent said boss and having at least two stages of impeller blades; at least two non-rotatable stator stages mounted one around each impeller stage and juxtaposed thereto, at least one of the stator stages being comprised of a plurality of arcuate segments carrying aligned stator blades on their inner surfaces, fastening means for pivotally interlocking said arcuate segments with one another and to said motor-stator housing, a passageway within said stator housing aligned with said impeller and stator blades to permit fluid flow therethrough, said impeller assembly being a discrete element composed of a central hub having a bore therethrough for mounting upon said shaft extension, said central hub being provided with a peripheral flange whereby a [piloting] *locating* means is provided for [mounting] *positioning* around the boss on said motor-stator housing, said impeller stages comprising cylindrical elements affixed to said flange whereby said discrete impeller assembly may be dynamically balanced as a unit and thereby be interchangeable with other rotor assemblies.

*2. A discrete impeller assembly for a miniature multistage motor-blower having an armature shaft and a housing comprising a central hub having a bore therethrough for mounting upon the armature shaft of said motor-blower, a peripheral flange provided upon said hub forming a locating means for positioning around and within the housing of said motor-blower, and a plurality of impeller stages comprising cylindrical elements affixed to said flange, said flange and impeller stages being so constructed and arranged that both the O.D. of the impeller stages and the I.D. of the flange may be simultaneously machined, whereby said impeller assembly may be dynamically balanced as a unit and thereby be interchangeable with other such assemblies.*

*3. A unitary miniature multistage motor-blower comprising, in combination: a main motor-stator housing having a mounting means provided thereon; a motor-armature rotatably mounted within said motor-stator housing and having an armature shaft extending therefrom past said mounting means; an impeller assembly comprising a central hub having a bore therethrough for mounting upon the armature shaft of said motor-blower, a peripheral flange provided upon said hub forming a locating means for positioning around and within the mounting means of said main housing, and a plurality of impeller stages comprising cylindrical elements affixed to said flange, said flange and impeller stages being so constructed and arranged that both the O.D. of the impeller stages and the I.D. of the flange may be simultaneously machined, whereby said impeller assembly may be dynamically balanced as a unit and thereby be interchangeable with other such assemblies.*

*4. The impeller assembly of claim 2 wherein said peripheral flange extends a distance sufficient to encompass a major portion of the motor portion of said motor-blower.*

*5. The impeller assembly of claim 3 wherein said peripheral flange extends a distance sufficient to encompass a major portion of the motor portion of said motor-armature.*

References Cited in the file of this patent or the original patent

UNITED STATES PATENTS

| | | |
|---|---|---|
| 976,260 | Hicks | Nov. 22, 1910 |
| 1,632,357 | White | June 14, 1927 |
| 2,488,945 | Troller et al. | Nov. 22, 1949 |
| 2,497,151 | Clark et al. | Feb. 14, 1950 |
| 2,592,471 | Sawyer | Apr. 8, 1952 |
| 2,639,087 | Goede | May 19, 1953 |
| 2,956,774 | Stalker | Oct. 18, 1960 |